May 31, 1932.　　　　A. K. LONGREN　　　　1,861,219
AIRPLANE CONSTRUCTION
Filed April 22, 1929　　　5 Sheets-Sheet 1

INVENTOR
Albin K. Longren
BY
ATTORNEY

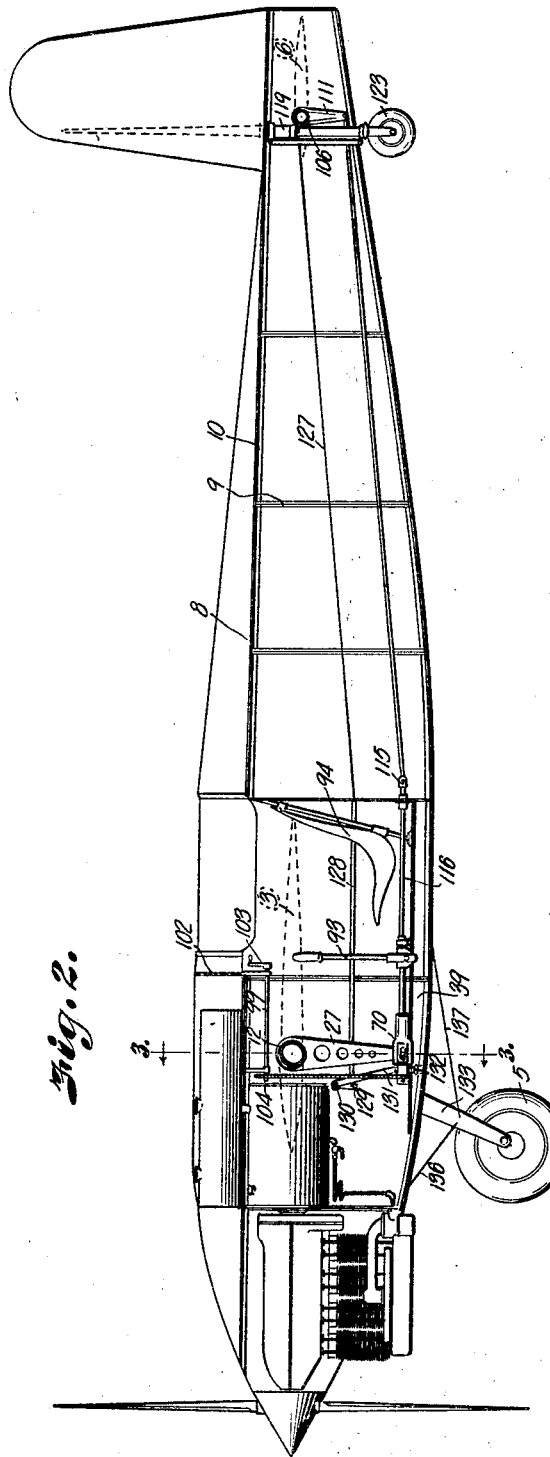
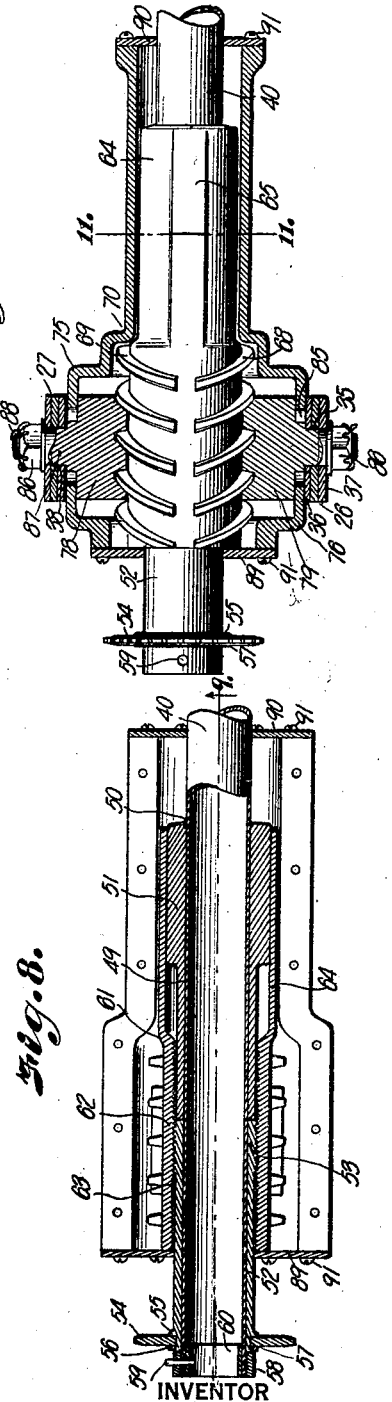

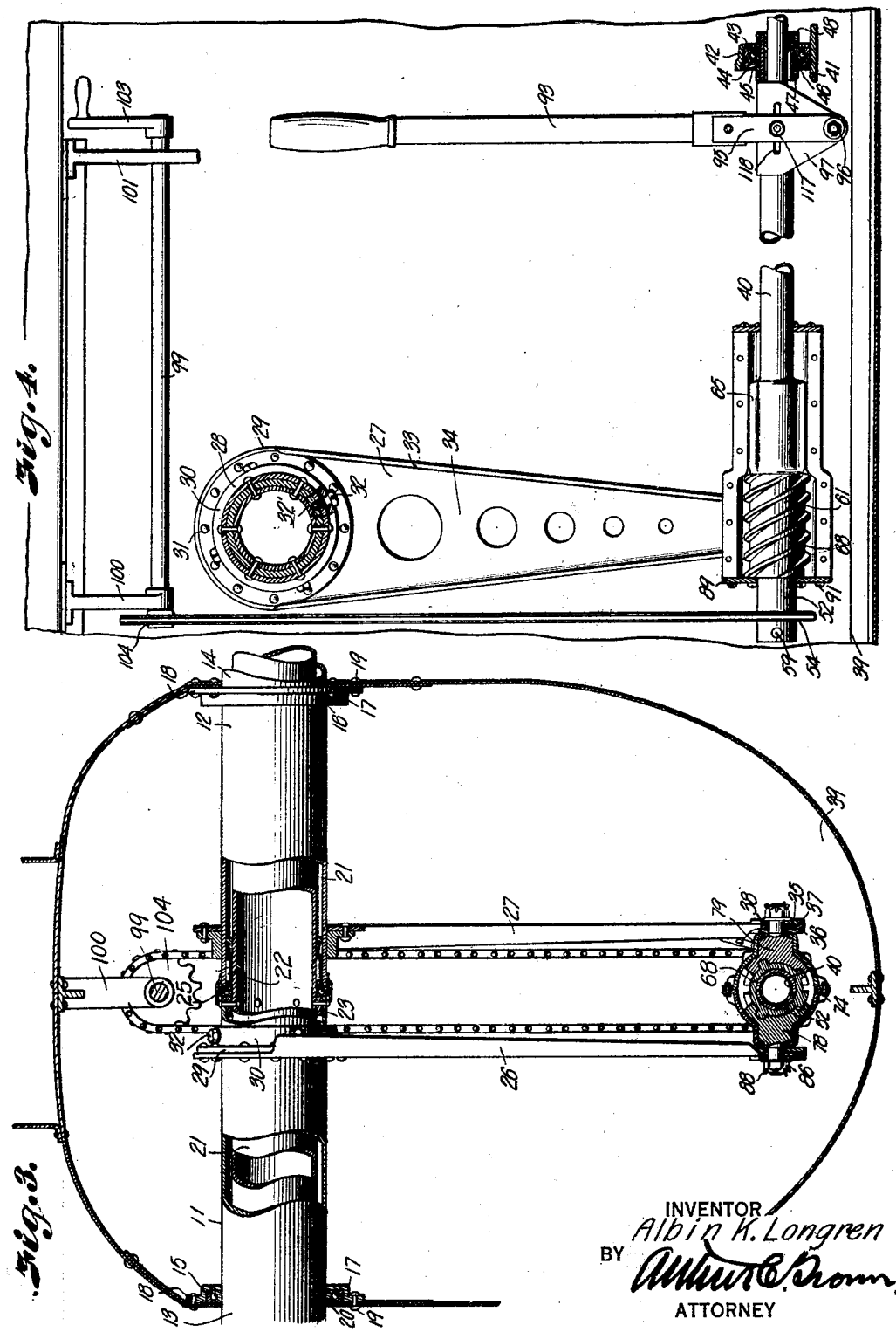

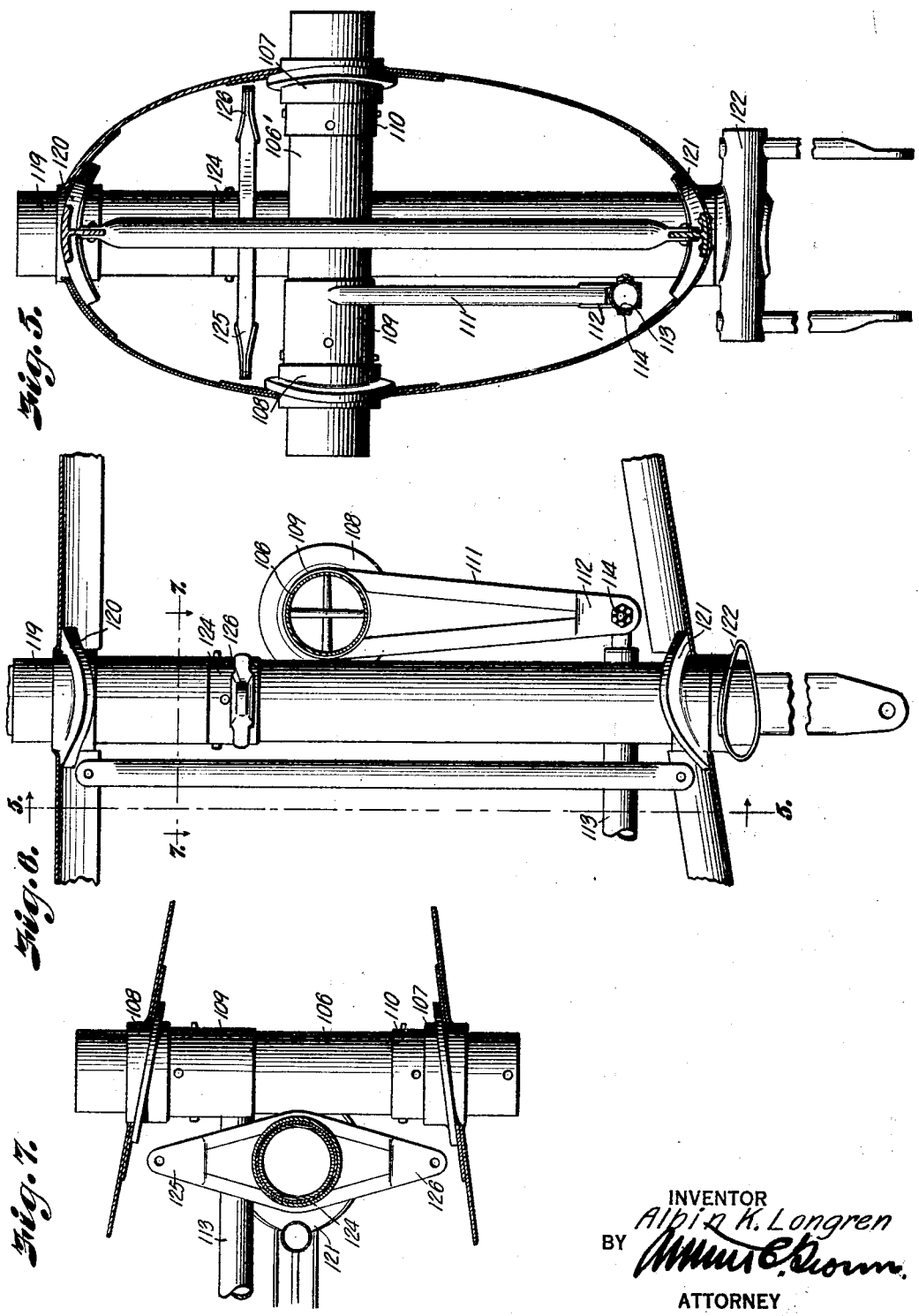

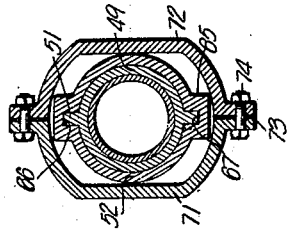

Patented May 31, 1932

1,861,219

UNITED STATES PATENT OFFICE

ALBIN K. LONGREN, OF TOPEKA, KANSAS

AIRPLANE CONSTRUCTION

Application filed April 22, 1929. Serial No. 357,071.

My invention relates to airplanes and particularly to the flight control surfaces of aircraft and the actuating gear therefor.

In the present airplane construction lateral roll and maneuvering movements of the plane are controlled by ailerons. These ailerons are hingedly movable and usually built into the trailing edges of the wing structure, and are designed to become a part of the general aerodynamic form of the wing sections. This aerodynamic form is calculated to produce the most efficient air flow, and changes or variation from the calculated aerodynamic form results in variation of the air flow. Consequently, movement of the ailerons changes the aerodynamic form of the wings, disrupting the air stream and producing very turbulent air flow over the ailerons and above the wing sections, directly preceding the ailerons. Movements of the ailerons also change the center of pressure of the sustaining surfaces, which together with the interrupted air flow, reduce the effective lift at the stalling angles, and in many instances cause autorotation of the airplane.

Ailerons also produce other undersirable effects and aggravate conditions which bring about loss of control, particularly at slow speeds in turbulent air near the ground.

It is therefore the principal object of this invention to provide a lateral control for airplanes which is more effective and efficient, particularly at slow landing speeds, and having none of the hazards incidental to the present aileron method of control.

It is also an object of the invention to provide incidence control, or ability to change the angle of attack of both wings while in full flight, whereby the wing sections may be perfectly trimmed for maximum speed with the least possible resistance.

It is a further object of the invention to provide a simplified airplane structure resulting in faster factory production methods and reduced cost of construction.

In accomplishing these and other objects of the invention, I have provided improved details of structure, the preferred forms of which are illustrated in the accompanying drawings, wherein:

Fig. 2 is a longitudinal vertical sectional view through the fuselage of the airplane.

Fig. 3 is an enlarged cross sectional view through the fuselage on the line 3—3 of Fig. 2, particularly illustrating the mounting of the wing spars and the actuating arms for rotating the wings.

Fig. 4 is an enlarged longitudinal sectional view through a portion of the fuselage, particularly illustrating the gearing for rotating the wings.

Fig. 5 is an enlarged cross sectional view on the line 5—5 of Fig. 6, particularly illustrating the spar mounting for the elevator and rudder surfaces.

Fig. 6 is a longitudinal sectional view through a portion of the fuselage, particularly illustrating the arms for oscillating the elevator and rudder surfaces.

Fig. 7 is a horizontal sectional view through the rudder spar taken on the line 7—7, Fig. 6.

Fig. 8 is a longitudinal sectional view through the torque tube and worm sleeve, particularly illustrating the method of adjusting the worm longitudinally of the torque tube for "trimming" the wing sections.

Fig. 9 is a horizontal sectional view taken on the line 9—9 of Fig. 8.

Fig. 10 is a detail perspective view of the wing rotating members shown in disassembled spaced relation.

Fig. 11 is a cross sectional view on the line 11—11, Fig. 9.

Fig. 12 is an enlarged sectional view through a portion of the wing spars particularly illustrating the roller bearings between the inner and outer spars.

Fig. 13 is a cross section on the line 13—13, Fig. 12.

Figure 1:
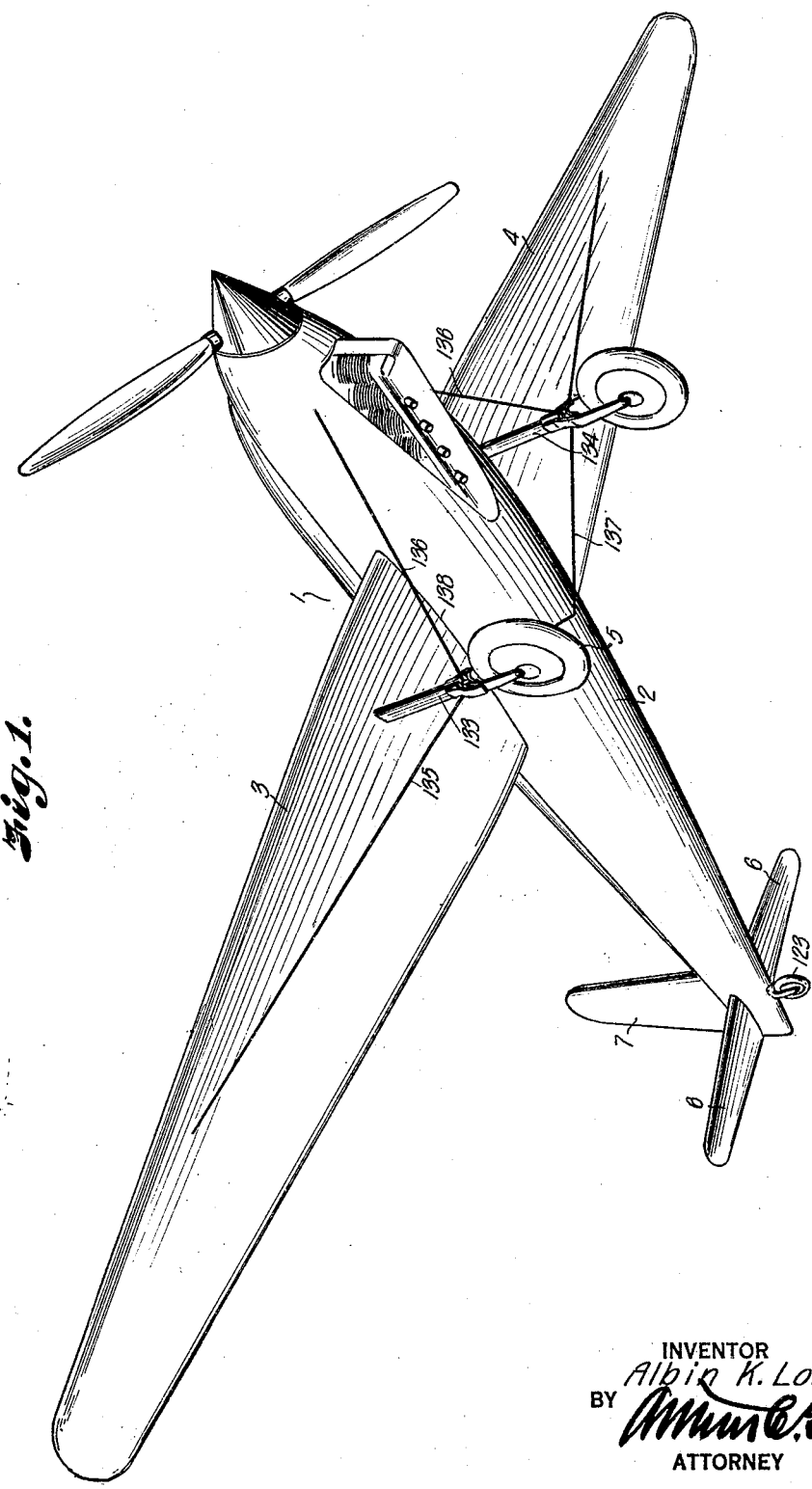
Fig. 1 is a perspective view of an airplane constructed in accordance with my invention.

Referring more in detail to the drawings:

1 designates an airplane constructed in accordance with my invention, including a fuselage 2, sustaining wings 3 and 4, landing gear 5, elevators 6, and rudder 7. The body 2 is preferably stream lined and constructed of sheet metal plates assembled on a suitable framework 8, including bulk heads 9 and longerons 10.

I have found it theoretically correct to move the wings or sustaining surfaces in such a way that turbulent air effects are not produced, and I am enabled to retain the wing sections in their aerodynamic form regardless of the rotative position of the wings, so that I may obtain a maximum amount of lift from them at all times according to the angle of attack and speed, and thereby overcome the difficulties encountered in the ordinary aileron method of controlling flight.

In carrying out my invention, I therefore provide for moving the sustaining surfaces such as the wings 3 and 4, and tail surfaces 6 and 7 to provide means for controlling the flight of the airplane.

The aerodynamic form of the wing sections are calculated for the most efficient air flow and load requirements to meet the use for which the plane is designed, and the usual ailerons are omitted so that the wing sections are of one unbroken surface free from moving parts which will change the aerodynamic form of the wings. The wing sections are built on wing spars 11 and 12 extending through the wings in the approximate center of pressure of their sustaining surfaces. The projecting ends 13 and 14 of the spars at the inner ends of the wings are preferably of tubular form and are rotatably mounted in anti-friction bearings 15 and 16 at opposite sides of the fuselage, the bearings being retained in cup-shaped receptacles 17, having peripheral flanges 18 riveted to the fuselage as at 19 in concentric alignment with openings 20, through which the spars are projected into the fuselage.

The inner ends 13 and 14 of the spars terminate in juxtaposition with each other adjacent the center line of the fuselage, and sleeved in the ends of the spars is a reinforcing spar 21 of smaller diameter than the inner diameter of the spars 11 and 12, permitting reception of roller bearings 22 between the reinforcing spar and the spar 12, as best shown in Fig. 3. Collars 23 are inserted in the space between the reinforcing spar and the spar 11, and are secured to the spars by rivets or the like to effect integral rotation of the spar 21 with the spar 11.

The roller bearings 22 are retained between collars 24 and are longitudinally spaced to provide for free rotation of the spar 12 on the telescoping spar 21, whereby the spars 11 and 12 may independently and freely rotate regardless of their direction or rotation. The ends of the spars 13 and 14 are preferably spaced apart, and received therebetween is a ball thrust bearing 25 sleeved on the reinforcing spar 21 to receive end thrust of the spars. Fixed to each of the spars adjacent their inner ends are actuating levers 26 and 27, whereby the spars may be rotated with relation to the fuselage for varying the angular setting of the wings, as later described.

The arms 26 and 27 are preferably formed of sheet metal stampings and are provided with openings 28 for receiving the spars. Riveted to the arms concentric with the openings 28 are attaching collars 29, having peripheral flanges 30 for receiving the attaching rivets 31. The collars 29 are positioned on the spars by screws 32 which are threaded through openings in the collar and are provided with tapered extensions 32' extending into aligning openings in the spar as best shown in Fig. 4.

The arms are preferably reinforced by side flanges 33 extending laterally along the longitudinal edges of the arms, and the web portions 34 of the arms are preferably apertured to reduce their weight. The free ends of the arms project downwardly into the lower portion of the fuselage and are provided with openings 35 for receiving trunnions of actuating elements later described. The ends of the arms are preferably reinforced by plates 36 and 37 having openings 38 aligning with the openings 35 to furnish an extended bearing for the trunnions. In order to actuate the wings to change their angle of attack in relation to the body of the airplane, I provide a novel actuating mechanism now described.

Extending longitudinally of the fuselage adjacent the floor of the cockpit 39 is a torque tube 40, the rear end of which is rotatably mounted in a bracket 41 bolted to the floor of the cockpit. The bracket 41 is provided with a cup-shaped recess 42 for receiving a self-aligning bearing 43 which is retained in the cup by a washer 44 threaded into the cup and having a central opening 45 to receive the torque tube. The inner race 46 of the bearing 43 is received on the torque tube, and is retained thereon by collars 47 and 48, respectively engaging the opposite sides of the race. The collar 47 is preferably brazed to the torque tube, and the collar 48 is preferably threaded on the torque tube and retained by a pin, extending through the collar and into the tube so that the torque tube may be removed from the bearing when desired.

The opposite end of the torque tube extends forwardly of the cockpit between the arms 26 and 27 and terminates somewhat in advance of the vertical plane of the spars. Fixed on the torque tube, in spaced relation with its forward end, is a sleeve 49 brazed to the torque tube as at 50, and provided on its periphery adjacent its rear end with a pair of splines 51.

Rotatably received on the end of the torque tube and abutting against the sleeve 49 is a sleeve 52. The end of the sleeve 52 adjacent the sleeve 49 is provided with an integral threaded collar 53 having comparatively fine pitch threads, and the opposite end of the sleeve is provided with a sprocket 54 for rotating the sleeve on the torque tube, as later described. The sprocket 54 is retained against a shoulder 55 formed on the sleeve by a collar 56 brazed to the end of the sleeve, as at 57.

In order to prevent longitudinal displacement of the sleeve 52, I provide the end of the torque tube with a retaining collar 58 threaded thereon and pinned thereto by a tapered pin 59 extending through the collar and through a reinforcing sleeve 60 sleeved in the torque tube, (Fig. 8). The pin 59 is retained in position by a cotter pin extending through the smaller end of the pin.

Slidably mounted on the sleeve 49 and threadedly engaged with the threads of the sleeve 52 is a worm member 61 adapted to be rotated by the torque tube, as now described.

The worm 61 comprises a sleeve portion 62 internally threaded as at 63, for engaging the thread on the sleeve 52, and extending from the rear end of the tube is a skirt 64 provided with laterally extending longitudinal ribs 65 and 66. The ribs 65 and 66 are provided interiorly of the skirt with longitudinal grooves 67 for receiving the splines 51 on the sleeve 49, so that the rotation of the torque tube will cause rotation of the worm member. Formed on the outer periphery at opposite sides of the worm member are right and left-hand threads 68 and 69, respectively, as best shown in Fig. 9. The sets of threads 68 and 69 are positioned normally facing the arms 26 and 27, so that the threads 68 are adapted to cause movement of the arm 26, and the threads 69 are adapted to cause movement of the arm 27 in reverse direction, as later described.

The worm gear member is enclosed in a tubular housing 70 comprising mated halves 71 and 72 provided along their side edges with laterally extending flanges 73, through which bolts 74 are projected to secure the halves 71 and 72 together, as best shown in Fig. 11.

The forward end of the housing is provided with lateral extensions 75 and 76 in alignment with the worm threads 68 and 69, respectively, and formed in the extensions are longitudinal box-like recesses 77 comprising guideways for slidably receiving threaded members 78 and 79 for engaging the worm threads, as now described.

The members 78 and 79 each comprises a segmental nut portion 80, having internal threads 81 corresponding to the pitch of the worm threads 68 or 69, and which cover about two-thirds of the worm threads. Extending from the nut portion 80 are rectangular bosses 82 adapted to slide snugly in the recesses 77, and projecting outwardly from the bosses 82 are trunnions 83 provided with collars 84 adapted to be received in slotted openings 85 formed in the extensions 75 and 76. The trunnions 83 are received in the bearing openings 35 of the arms 26 and 27, and are retained therein by nuts 86 threaded on reduced extensions 87 projecting from the ends of the trunnions. The nuts 86 are of the castellated type and are retained in adjusted position by cotter pins 88 which extend through the nuts and the threaded extensions 87 of the trunnions.

The ends of the housing are closed by cover plates 89 and 90, bolted to the housing by cap screws 91 extending through the plates and into threaded bosses 92 formed in the housing. Thus it is apparent that when the torque tube is oscillated the sleeve 49, due to the spline connection, will oscillate the worm sleeve 62. Oscillation of the worm will cause movement of the nuts 78 and 79 longitudinally of their guideways, one in a forward and the other in a backward direction, due to the right and left-hand threads of the worm so that one of the arms 26 or 27 is moved in a forwardly direction and the other in a rearwardly direction to rock the wings on their axes for controlling lateral roll of the airplane.

The torque tube is rotated by the conventional control stick 93 positioned adjacent the pilot's seat 94. The control stick is provided on its lower end with a yoke 95 straddling the torque tube, and pivotally connected by a bolt 96 with a bracket 97 which is fixed on the torque tube.

In order to provide incidence control or means for changing the angle of attack of both wings while in full flight, I provide a longitudinally extending shaft 99 which is rotatably mounted in brackets 100 and 101 attached to the upper longeron 10. The rear end of the shaft 99 is provided adjacent the instrument board 102 with a crank 103, and the forward end of the shaft is provided with a sprocket wheel 104 complementary to the sprocket 54 on the sleeve 52, the sprocket 54 being actuated by the sprocket 104 through a chain belt 105 running over the sprockets. Thus it is apparent that rotation of the shaft 99 by the crank 103 will rotate the sleeve 52, and since the sleeve 52 is retained against longitudinal movement on the torque tube, rotation of the sleeve will move the worm sleeve longitudinally thereon to move the arms 26 and 27, changing the setting of the wings with relation to the fuselage. By this arrangement, due to the relatively fine threads on the sleeve 52, the wings can be trimmed very accurately for maximum speed of the plane while it is in full flight.

Attention is here called to the fact that the torque tube is pivoted at its rear end in the self-aligning bearing, and that its forward end is suspended from the spars by the arms 26 and 27 so that the bearing surfaces are reduced to a minimum to reduce the number of points that may be liable to cause lost motion, which would seriously interfere with control of the airplane.

The elevators 6 are mounted in the fuselage in a manner similar to that of the swing sections, as now described. The elevator sections are built on spars 106 telescoping into a sleeve 106′ rotatably mounted in bearings 107 and 108 attached to the inner side of the fuselage similarly to the bearings 15 and 16, previously described. The sleeve 106′ is retained against longitudinal movement through the fuselage by collars 109 and 110 pinned to the sleeve and engaging the bearings 108 and 107, respectively, as best shown in Fig. 5.

The collar 109 is provided with a depending arm 111 having a yoke 112 on its lower end for attachment with an actuating rod 113 which is pivotally mounted therein by a bolt 114 extending through the yoke and the rod, as shown in Fig. 5.

The rod 113 is preferably formed of tubular pipe sections and extends forwardly along the fuselage to a point adjacent the rear of the pilot's seat where it is connected by a universal joint 115 with a rod 116 that is slidably received in the rear end of the torque tube 40, and is connected with the yoke of the control stick by a bolt 117 extending through the yoke and through slots 118 formed in the bracket plate 97, as best shown in Fig. 4, so that when the control stick is rocked on the bolt 96 and pivoted forwardly or rearwardly of the plane, the rods 116 and 113 are shifted longitudinally to rock the elevators of the plane.

The rudder 7 is mounted in a vertical tubular member 119 which is rotatably supported in bearings 120 and 121 attached to the upper and lower portions of the fuselage forwardly of the elevator spar 106, as illustrated in Fig. 5. The rudder 7 is formed similarly to the wings and elevators, and is carried on the upper end of a spar 119′ which extends through a tubular member 119 above the tail of the fuselage, and mounted on the lower end of the spar below the fuselage is a yoke-shaped fork 122 for mounting the tail wheel 123.

Fixed to the tubular member 119 above the spar 106 is a collar 124 having laterally directed arms 125 and 126 whereby the member 119 may be oscillated to move the rudder and tail wheel, by means of cables extending along the sides of the fuselage and through tubular guideways 128 at the sides of the pilot seat to a point adjacent the arms 26 and 27 where they are connected with levers 129 fixed on a shaft 130 extending across the fuselage.

Foot actuated levers 131 are also attached to the shaft and extend downwardly into the lower portion of the fuselage, and are connected with slotted guides 132 so that the weight of the pilot's feet are supported thereby and no strain is placed on the cables 127 other than that which it takes to actuate the rudder.

The landing gear 5 comprises spaced struts 133 and 134 attached to the wings 3 and 4 outside of the slip stream of the propeller, and are preferably connected with the wing spars. The struts are braced from the fuselage and wing structures by suitable wire braces 135, 136 and 137, as best shown in Fig. 1.

Attention is called to the fact that the ends 138 of the sustaining surfaces are shaped approximately to the contour of the fuselage so that when the surfaces are oscillated no opening is produced therebetween to cause air turbulence.

In piloting a plane constructed as above described, when "taking off" the wings are set at a greater angle of attack than is used in flight so that a shorter run and quicker take off is possible. This is accomplished by actuating the crank 103 which in turn rotates the sleeve 52 and moves the worm housing and nut segments forwardly of the torque tube to swing the arms 26 and 27 and rock the front edges of the wings upwardly, and their rear edges downwardly.

Lateral control of the plane is accomplished by swinging the control stick from center to right or left to rotate the torque tube which causes the worm to rotate from center to one side or the other, and the worm threads move one of the nuts forwardly and the other rearwardly a corresponding distance, thereby rocking one of the wings upwardly and the other downwardly similar to the conventional ailerons.

However, the movements are at very small angles compared to the movements of the aileron and without the aileron disturbance or changing the center of pressure of the air load on the wings. Consequently the wings retain their maximum lift at all times according to their setting and liability of loss of control is greatly reduced in taking off. After the pilot has attained his desired altitude the wing sections are trimmed by actuating the crank 103 to reduce the angle of attack of the wing sections until their resistance has been reduced to a minimum and the plane is thereby leveled to reduce drag produced by the body and tail surfaces so that high speeds can be obtained with a minimum of power.

From the foregoing it is apparent that by oscillating the wing sections as a whole to change their angle of attack in relation to the plane's path of flight and positively increasing the lift on one wing and decreasing the lift on the other, all the effects of the ordinary ailerons can be produced without their known hazards and giving very positive and efficient control of the ship.

What I claim and desire to secure by Letters Patent is:

1. In an airplane including a fuselage, wings at opposite sides of the fuselage, spars supporting the wings, bearings for mounting the spars, lever arms attached to the spars, a torque tube mounted in the fuselage, a worm member operably connected with the torque tube having right and left threads, a housing for the worm member, nuts slidable in the housing and engaging the respective threads, means connecting the nuts with the arms, and means for oscillating the torque tube to actuate the arms to effect oscillation of the wings.

2. In an airplane including a fuselage, wings at opposite sides of the fuselage, spars projecting from the wings, bearings for mounting the spars, lever arms attached to the spars, a torque tube mounted in the fuselage, a worm member operably connected with the tube having right and left threads, a housing for the worm member, nuts slidable in the housing and engaging the respective threads, means connecting the nuts with the arms, means for oscillating the torque tube to actuate the arms effecting oscillation of the wings, and means for shifting the worm longitudinally of the torque tube to change the angle of attack.

3. In an airplane including a fuselage, wings at opposite sides of the fuselage, spars projecting from the wings, bearings for mounting the spars, lever arms attached to the spars, a torque tube pivotally and rotatably mounted at one end, a housing mounted on the opposite end, trunnion members slidable in the housing and connected with the arms, an actuator on the torque tube for slidably actuating the trunnions to shift the lever arms for effecting oscillation of the wings to control lateral roll of the airplane.

4. In an airplane including a fuselage, tubular wing spars rotatably mounted in the fuselage in a plane through the center line of the plane's propeller, wings on the spars, a reinforcing spar sleeved within and fixed to one of the spars and loosely sleeving the other spar, roller bearings between the reinforcing spar and the loose spar, and means for simultaneously oscillating the spars in opposite directions to each other to control lateral roll of the airplane.

5. In an airplane including a fuselage, wings at opposite sides of the fuselage, spars projecting from the wings, bearings for mounting the spars, lever arms attached to the spars, a torque tube pivotally and rotatably mounted at one end, a housing mounted on the opposite end, trunnion members slidable in the housing and connected with the arms, an actuator slidably keyed to the torque tube for actuating the lever arms in opposite directions upon oscillation of the torque tube, a sleeve on the torque tube threadedly engaged with the actuator, and means for rotating the sleeve to effect longitudinal movement of the actuator to move the lever arms in the same direction.

6. In an airplane including a fuselage, wings pivotally supported by the fuselage, a torque tube mounted in the fuselage, a worm member operably connected with the torque tube having right and left threads, nuts associated with the worm member and operable thereby, means operably connecting the wings with said nuts and means for oscillating the torque tube to effect oscillation of the wings in opposite directions.

7. In an airplane including a fuselage, wings pivotally supported by the fuselage, a torque tube mounted in the fuselage, a worm member operably connected with the torque tube having right and left threads, nuts associated with the worm member and operable thereby, means operably connecting the wings with said nuts, means for oscillating the torque tube to effect oscillation of the wings in opposite directions, and means for shifting the worm member on the torque tube to effect change of the angle of attack.

8. In an airplane including a fuselage, wings pivoted for oscillation at opposite sides of the fuselage, a torque member mounted in the fuselage, a housing mounted on the torque member, trunnion members slidable in the housing, an actuator on the torque member for actuating the trunnions and means operably connecting the trunnion members with the wings for actuating the wings upon sliding movement of the trunnion members.

9. In an airplane including a fuselage, wings pivoted for oscillation at opposite sides of the fuselage, lever arms operably connected with the wings, a shaft pivotally and rotatably mounted in the fuselage, a right and left threaded worm on the shaft and means operable by the worm for actuating the lever arms.

10. In an airplane including a fuselage, wings at opposite sides of the fuselage, spars supporting the wings, bearings for mounting the spars in the fuselage, actuating members on the spars, a torque member mounted in the fuselage, a worm member operably connected with the torque member and having right and left threads, a housing for the worm member, worm-engaging members in the housing for engaging the respective threads, means operably connecting said spar actuating members with the worm-engaging members, and means for oscillating the torque member to effect oscillation of the wings.

11. In an airplane including a fuselage, wings at opposite sides of the fuselage, spars supporting the wings, bearings for mounting the spars in the fuselage, actuating members on the spars, a torque member mounted in the fuselage, a worm member operably connected with the torque member and having right and left threads, a housing for the worm member, worm-engaging members in the housing for engaging the respective threads, means operably connecting said spar actuating members with the worm-engaging members, means for oscillating the torque member to effect oscillation of the wings, and means associated with the torque member for changing angle of attack of the wings.

12. In an airplane including a fuselage, and sustaining members pivotally carried by the fuselage, a torque member having one end pivotally and rotatably mounted in the fuselage, lever arms operably connected with said sustaining members and supporting an end of the torque member, a worm member on the torque member, and means operable by the worm member for actuating the lever arms to pivot the sustaining members.

13. In an airplane including a fuselage, wings pivotally carried by the fuselage, a torque member mounted in the fuselage, an actuator on the torque member, means for actuating the torque member to rotate said actuator, means associated with the actuator for pivotally moving the wings in opposite directions upon rotative movements of the actuator, a sleeve on the torque member and threadedly engaged with the actuator, and means for rotating the sleeve to effect longitudinal movement of the actuator to move the wings in the same direction to change their angle of attack.

14. A wing control for airplanes comprising a torque member, a worm member keyed to the torque member having sections of right hand threads on one side and sections of left hand threads on its other side, a housing for the worm member, nuts slidable in the housing and engaging the respective thread sections, and trunnion members on the nuts.

15. A wing control for airplanes comprising a torque member, a worm member keyed to the torque member having sections of right hand threads on one side and sections of left hand threads on its other side, a housing for the worm member, nuts slidable in the housing and engaging the respective thread sections, trunnion members on the nuts, a sleeve member rotatably mounted on the torque member threadedly engaged with the worm member, and means for rotating the sleeve to move the worm member longitudinally of the torque member.

In testimony whereof I affix my signature.

ALBIN K. LONGREN.